B. McCAUGHEY.
BROILER.
APPLICATION FILED JUNE 28, 1909.

946,859.

Patented Jan. 18, 1910.

WITNESSES.
Albert G. Piergenskowski.
George H. McLaughlin.

INVENTOR.
Bernard McCaughey
By Horatio E. Bellows
ATTORNEY.

UNITED STATES PATENT OFFICE.

BERNARD McCAUGHEY, OF PAWTUCKET, RHODE ISLAND.

BROILER.

946,859.  Specification of Letters Patent.  Patented Jan. 18, 1910.

Application filed June 28, 1909. Serial No. 504,694.

*To all whom it may concern:*

Be it known that I, BERNARD McCAUGHEY, a citizen of the United States, residing at Pawtucket, in the county of Providence and State of Rhode Island, have invented certain new and useful Improvements in Broilers, of which the following is a specification.

My invention relates to broilers and has for its objects the following: to provide in a portable structure means for contemporaneously cooking different articles; to utilize a maximum of the heat; to thoroughly cook the drippings from the material broiled; to adjust the direction of the flame; and to prevent the accumulation of smoke.

Other objects will be hereinafter pointed out.

Invention consists in the features directed to the enumerated ends which form the subject matter of the appended claims.

Figure 1:
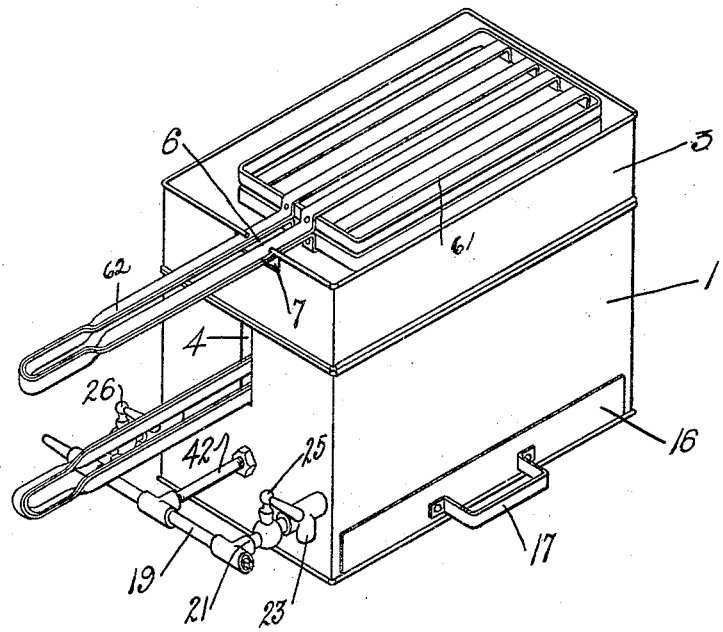
Figure 2:
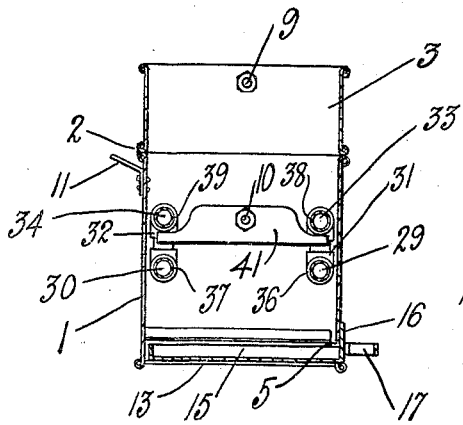
Figure 3:
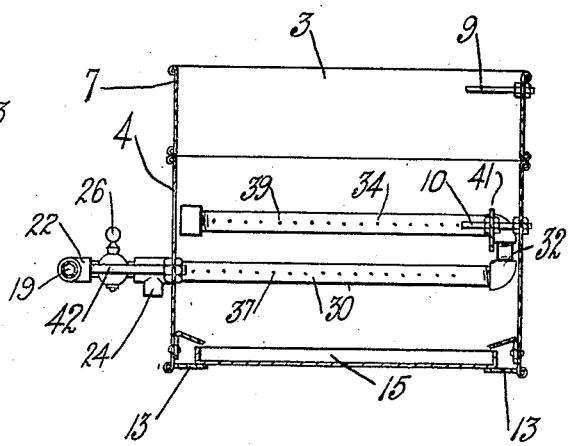

In the drawings which form a part of this specification, Figure 1 is a perspective view of my broiler, Fig. 2, a central transverse section of the same omitting the frames, Fig. 3, a central longitudinal section of the housing, omitting the frames.

Like reference characters indicate like parts throughout the views.

My broiler comprises a rectangular oblong casing 1 to whose upper portion is connected by hinges 2 an upper section or frame 3 whose walls are, when the section is closed, in the planes of the respective walls of the casing. The upper margin of the casing front wall is provided with a vertical slot 4; and the lower margin of one side wall of the casing, with a horizontal opening 5. The section 3 has in the top of its end wall a vertical marginal slot 6 leading to a horizontal slot 7 below. A pivot pin 9 is fixed in the rear end wall of the section 3 in alinement with the opening 7. A similar pin 10 fixed in the rear end wall of the casing 1 is in alinement with the slot 4. The casing 1 has a stop 11 for the section 3; also guide strips 13 fixed to the bottoms of the end walls upon which rests a drip pan 15 slidable in the opening 5 and provided with a front plate 16 overlapping the exterior face of the casing side wall, thus completely excluding the air from the opening 5. Upon the strip 16 is a handle 17.

Fuel is supplied to the casing through a pipe 19 from which branch at right angles thereto pipes 21 and 22 having respectively air inlets 23 and 24, and cocks 25 and 26, passing through apertures in the forward end wall. Loosely threaded in the pipes 21 and 22 are the ends of pipes 29 and 30 which extend across the interior of the casing along the side walls thereof, and whose opposite ends are loosely threaded into joints or elbows 31 and 32, near or abutting against the rear end wall of the casing. Loosely threaded into the joints 31 and 32 are pipes 33 and 34 which are parallel with and in the vertical planes of the pipes 29 and 30 respectively. Pipes 29, 30, 32 and 33, are provided respectively with longitudinal series of perforations 36, 37, 38, and 39. It will be noted that by manually rotating the loose pipes, 29, 30, 33, and 34 the direction of the flames issuing from their respective perforations can be adjusted to any desired angle as occasion requires. The ends of a plate 41 fixed to the pin 10 engage the pipe joints and assist in supporting the same. A rod 42 fixed in the front end wall of the casing is connected with the pipe 19 and forms a brace therefor. Two frames are employed, the lower one for meat, and the other 61 for toasting. The frame 61 is pivoted at one end upon pin 9. Its handles 62 rest in the horizontal slot 7 and thus the frame is in horizontal position above the broiling frame.

It will be noted that the open top of the casing discourages the generation of smoke, and that the construction of the lower portion of the casing is such as to prevent the access of air into the lower portion thereof whereby the drippings are maintained at a high temperature. The location of the two broiling frames at right angles to each other utilizes a maximum of the heat furnished by the flames.

What I claim is,—

1. In a broiler, the combination with the casing, of an open section resting upon the casing and pivotally connected therewith, fuel pipes in the casing provided with perforations, a broiling frame in the casing intermediate the pipes, and a toasting frame in the section.

2. In a broiler, the combination with the casing, of an open section resting upon the casing and pivotally connected therewith, fuel pipes in the casing provided with perforations, a broiling frame in the casing intermediate the pipes, and a toasting frame in the section disposed in a plane at right angles to the plane of the first frame.

3. In a broiler, the combination with the casing, of a section pivotally connected with the upper portion of the casing, fuel pipes in the casing provided with perforations, a normally vertical broiling frame mounted in the casing intermediate the pipes, and a normally horizontal toasting frame pivotally mounted in the section above the first mentioned frame.

4. In a broiler, the combination with a casing provided with an open vertical slot, of a section pivotally connected with the casing and provided with an open horizontal slot above the first mentioned slot, fuel pipes in the casing provided with perforations, a broiling frame mounted in the casing intermediate the pipes, handles upon the frame extending through the vertical slot, a second toasting frame pivotally mounted in the section, and handles upon the second frame extending through the horizontal slot.

5. In a broiler, the combination with a casing, of fuel pipes rotatably mounted in the casing and provided with perforations, and a broiling frame mounted in the casing intermediate the pipes and normally in a vertical plane.

6. In a broiler, the combination with a casing, of a vertically disposed broiler frame mounted in the casing, and axially adjustable fuel pipes provided with perforations mounted in the casing upon opposite sides of the frame.

7. In a broiler, the combination with a casing provided with openings in its front end wall, of a fuel feed pipe exterior of the casing, pipe joints within the casing near its rear end wall, branch feed pipes provided with perforations extending through the openings and rotatably mounted in the fuel feed pipe and in the pipe joints, and supplementary pipes provided with perforations rotatably mounted in the pipe joints and extending above and parallel with the branch pipes, a pin in the rear end wall, and a broiling frame mounted upon the pin.

8. In a broiler, the combination with a casing, of a fuel feed pipe, branch feed pipes upon the fuel feed pipe extending within the casing provided with perforations, pipe joints upon the ends of the branch pipes, supplementary pipes provided with perforations rotatably mounted in the pipe joints and in the planes of the branch pipes, and a broiling frame mounted in the casing intermediate the branch pipes.

In testimony whereof I have affixed my signature in presence of two witnesses.

BERNARD McCAUGHEY.

Witnesses:
MARCUS W. MORTON,
HORATIO E. BELLOWS.